United States Patent [19]

Lecron et al.

[11] 4,398,933
[45] Aug. 16, 1983

[54] METHOD AND APPARATUS FOR THE MANUFACTURE OF FIBERS

[75] Inventors: Jacques Lecron, Challes les Eaux; Maxime Manera, Jacob Bellecombette; Jean-Paul Faure, Chignin; Jean-Pierre Renaudin, Cognin, all of France

[73] Assignee: Societe Vetrotex Saint-Gobain, Chambery, France

[21] Appl. No.: 374,272

[22] Filed: May 3, 1982

Related U.S. Application Data

[63] Continuation-in-part of Ser. No. 207,712, Nov. 17, 1980, abandoned.

[51] Int. Cl.³ .......................................... C03B 37/025
[52] U.S. Cl. .............................................. 65/1; 65/2; 65/12; 425/131.5; 425/463
[58] Field of Search ................................. 65/1, 2, 12

[56] References Cited

U.S. PATENT DOCUMENTS

| | | | |
|---|---|---|---|
| 2,947,027 | 8/1960 | Slayter | 65/1 X |
| 3,475,147 | 10/1969 | Stalego | 65/1 |
| 3,574,581 | 4/1971 | Strickland et al. | 65/1 |
| 3,979,195 | 9/1976 | Strickland | 65/1 |
| 3,982,915 | 9/1976 | Coggin | 65/1 |
| 4,328,015 | 5/1982 | Melan et al. | 65/1 |
| 4,343,635 | 8/1982 | Kim et al. | 65/1 |
| 4,351,656 | 9/1982 | Jensen | 65/1 |

Primary Examiner—Robert L. Lindsay, Jr.
Attorney, Agent, or Firm—John T. Synnestvedt; Charles H. Lindrooth

[57] ABSTRACT

A process and apparatus for forming fibers from attenuable materials, such as molten glass, by attenuating streams of glass from the bottom of a bushing wherein the bottom has downwardly presented wall portions at upper and lower levels. According to the disclosure the upper or lower wall portions are formed into a series of elongated bosses each containing at least one row of cells termed alveoles, each alveole having a multiplicity of orifices extending through the lower wall portion of its boss. Filamentary material is manufactured by drawing at least one filament from each alveole independently of each other alveole regardless of whether or not the material has flooded the bottom surface of any boss. In one embodiment shallow transverse grooves in the lower wall portions of the bosses separate the orifices of one alveole from the orifices of adjacent alveoles so that flooding is confined to a single alveole. Controlled cooling permits the selective drawing of one or a plurality of filaments from the alveoles.

33 Claims, 12 Drawing Figures

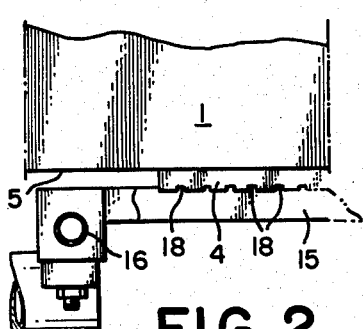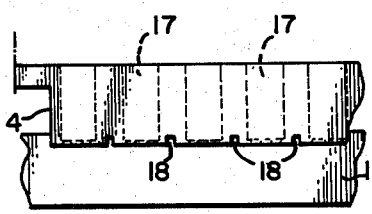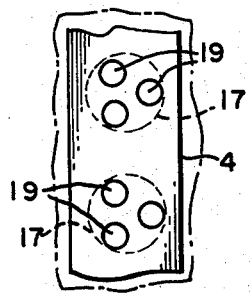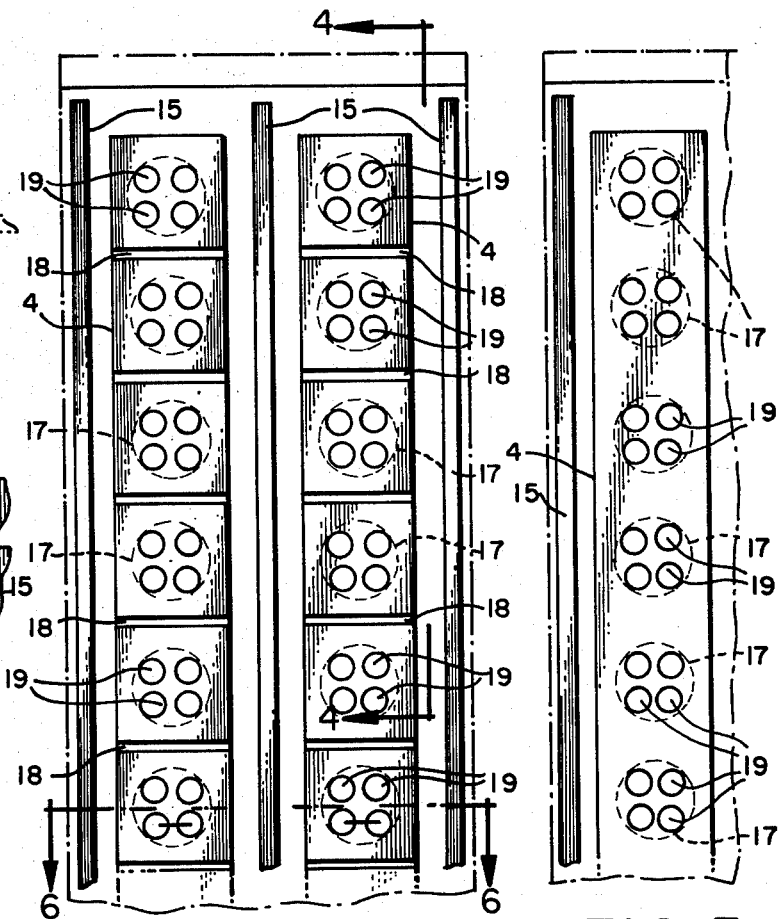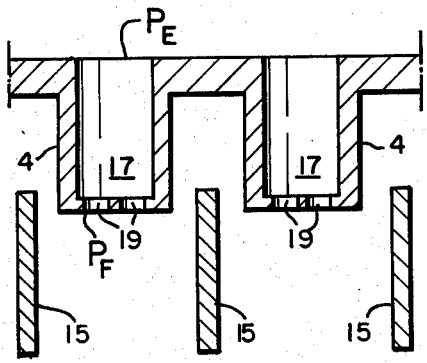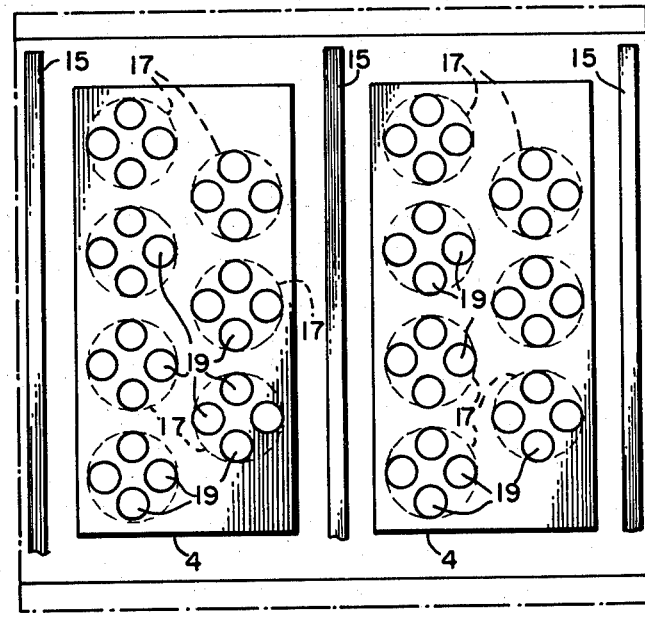

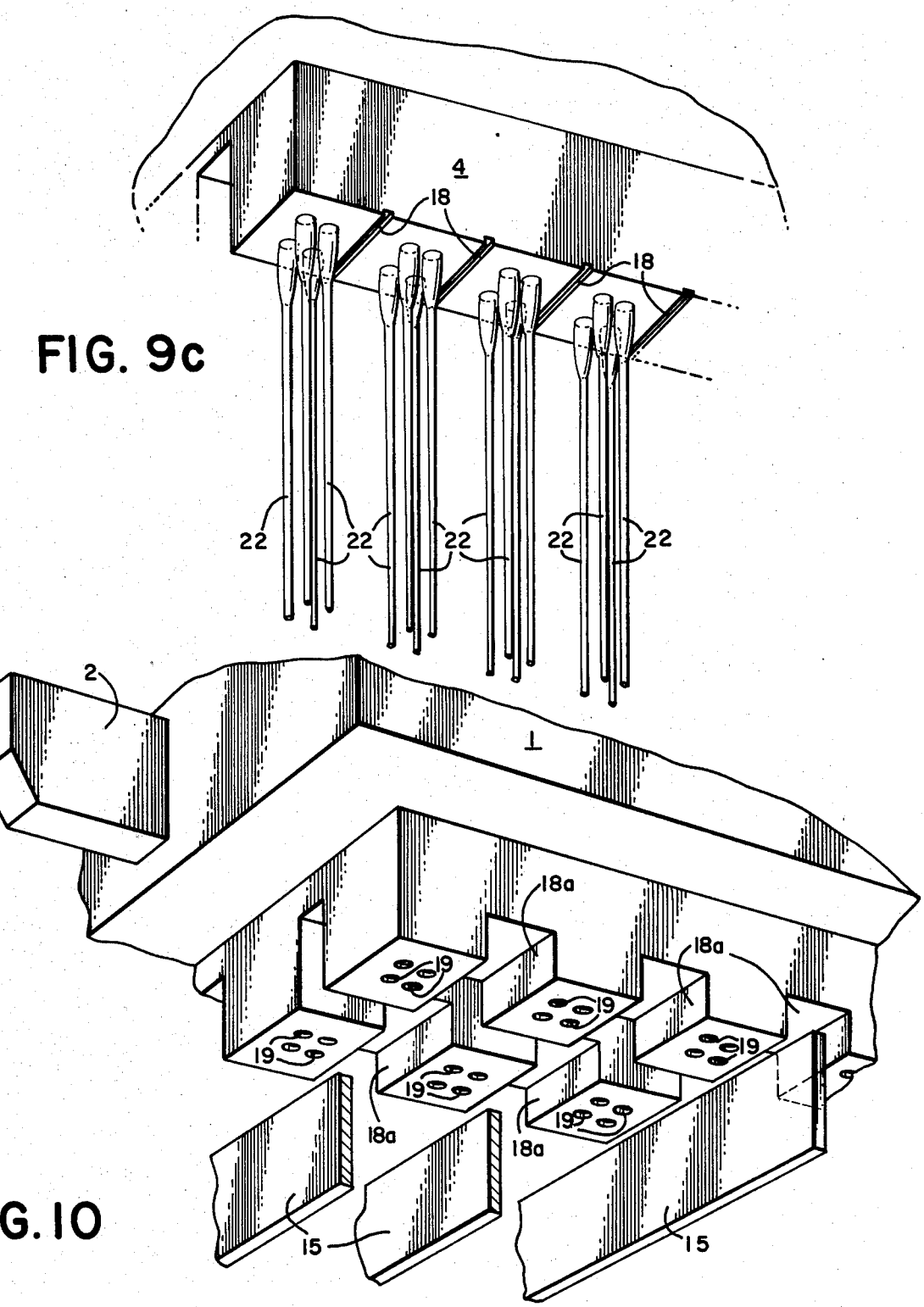

METHOD AND APPARATUS FOR THE MANUFACTURE OF FIBERS

RELATED APPLICATIONS

This application is a continuation-in-part of our co-pending application Ser. No. 207,712 filed Nov. 17, 1980 now abandoned in favor of application Ser. No. 377,903 filed May 13, 1982, as a continuation of said earlier filed application, and is related to co-pending application Ser. No. 207,711 also filed on Nov. 17, 1980. This application is also related to co-pending applications Ser. Nos. 374,478 and 374,479 all three applications having been filed on May 3, 1982, in the names of the same inventors.

FIELD OF THE INVENTION

The present invention relates to process and apparatus for the manufacture of fibers from attenuable materials, especially mineral materials, such as glass, by attenuating the material in attenuable condition at the exit of orifices in the bottom of a bushing and in particular to the use of bushing bottoms having a high density of orifices. In particular, it concerns the manufacture of continuous fibers by the mechanical attenuation of streams into filaments which are gathered into strands which are generally wound onto a collet.

BACKGROUND OF THE INVENTION

The most commonly used procedure for the manufacture of continuous fiber product, such as strand, consists of drawing streams of attenuable material in attenuable condition, such as molten glass, from a bushing, the base of which is equipped with orificed tips. When cooling means are associated with the tips, stable separation of the streams in enhanced. The tips tend to minimize the phenomenon of "flooding" of the bushing base particularly at the time of a filament rupture during the fiberization operation. This flooding is manifested by the tendency of the molten material issuing from an orifice to spread over the surrounding undersurface of the base plate because of capillary action and the wetting effects of the plate. At the moment of filament rupture during the fiberization operation, the presence of tips tends to reduce the massive flooding of the base plate which would otherwise occur.

Taking into account the difficulties in manufacturing a bushing base with tips and also the significant surface area occupied by the tips, various efforts have been made to eliminate them and to replace the tipped bushing base with a generally flat perforated plate having a large number of orifices within a given surface area. The result of these efforts is the simultaneous attenuation of a larger number of filaments per bushing and consequently the possibility of the manufacture of new products, and a reduction in deformation problems of the bushing base which become progressively more significant as bushing surface area becomes larger.

Numerous techniques, as described in the co-pending applications, have been proposed in an effort to reduce the tendency towards flooding of non-tipped bushings, and thereby to attempt to reduce the problems inherent in establishing conditions suitable for fiberizing after such flooding.

The foregoing co-pending application Ser. No. 207,712 discloses method and apparatus for obtaining controlled and stable flooding confined to well defined areas instead of working towards reducing the tendency towards flooding. These areas are located in the bushing bottoms and are perforated with a plurality of orifices arranged to facilitate restarting. According to application Ser. No. 207,711 a bushing is provided with elongated hollow channels, separated by downwardly open grooves in which cooling fins, located lengthwise of the channels, may be mounted. The bottom walls of the channels have orifices which are desirably provided in at least two spaced parallel rows. Bushings of the kind just described are both characterized by their capability of reducing temperature differences existing at the exits of the orifices to very small values. Because of this temperature stability, fiberization can be carried out with relatively few interruptions and very fine fibers of uniform diameter can be produced.

According to the invention disclosed in application Ser. No. 207,712, series of bosses which define cells or alveoles are disclosed. The bottom walls of the bosses are substantially continuous having a plurality of orifices in communication with each alveole. According to application Ser. No. 207,712 the region of the bottom wall in communication with each alveole is flooded and fiberization of the glass may proceed selectively either into a single fiber from each alveole or into as many fibers as there are orifices in communication with each alveole. Bushings described in U.S. application Ser. No. 207,712 have the capability of making strand comprised of fibers of different sizes. The bushings are easy to start up and to restart in the event of filament rupture.

The bushings described in both applications are characterized by having a large number of orifices per unit of surface area, a large total number of orifices per bushing, and good fiberization stability, even for the manufacture of filaments of small diameter.

SUMMARY AND OBJECTS OF THE INVENTION

The present invention has as an object a combination of the advantages of the hollow channel configurations disclosed in application Ser. No. 207,711 and the series of bosses each housing alveoles as disclosed in application Ser. No. 207,712.

Among the other objects and advantages of the invention are the provision for increases in the density of orifices, simplification of construction of bushing bottoms, a reduction of unintended flooding by an increase in the thermal inertia of the bushing and also improved electrical conductivity in bushings heated by the joule effect.

Briefly stated, the invention contemplates the provision of elongated bosses separated by downwardly open channels. Each boss is provided with a plurality of spaced apart cells or alveoles. A plurality of orifices in the bottoms of the bosses communicate with each alveole. The alveoles within each boss may be arranged in one or more rows.

Shallow grooves may be provided in the base or bottom of each boss to prevent flooding of the molten material issuing from the orifices in communication with one alveole to the molten material issuing from the orifices in communication with adjacent alveoles.

Preferred apparatus and method are described in detail hereinafter and illustrated in the accompanying drawings.

BRIEF DESCRIPTION OF THE DRAWINGS

FIG. 2 is a transverse section of a portion of the bushing base shown in FIG. 1.

FIG. 3 is a plan view on an enlarged scale of a part of the bushing base of FIG. 1.

FIG. 4 is a sectional view, on a reduced scale with respect to FIG. 3, of the bottom of the bushing taken on line 4—4 of FIG. 3.

FIG. 5 is a plan view similar to FIG. 3 but illustrating a modified form of the invention.

FIG. 6 is a longitudinal cross section of a bushing base taken along line 6—6 of FIG. 3.

FIG. 7 is a fragmentary view of a portion of a boss having three orifices in communication with each alveole.

FIG. 8 is a view similar to FIG. 3 showing a modified form of the invention.

FIGS. 9a through 9c are perspective views showing steps in the drawing of filaments utilizing apparatus and techniques of the invention.

FIG. 10 is a perspective view of a further embodiment of bushing bottom incorporating the principles of the invention.

DETAILED DESCRIPTION OF THE INVENTION

Figure 1:
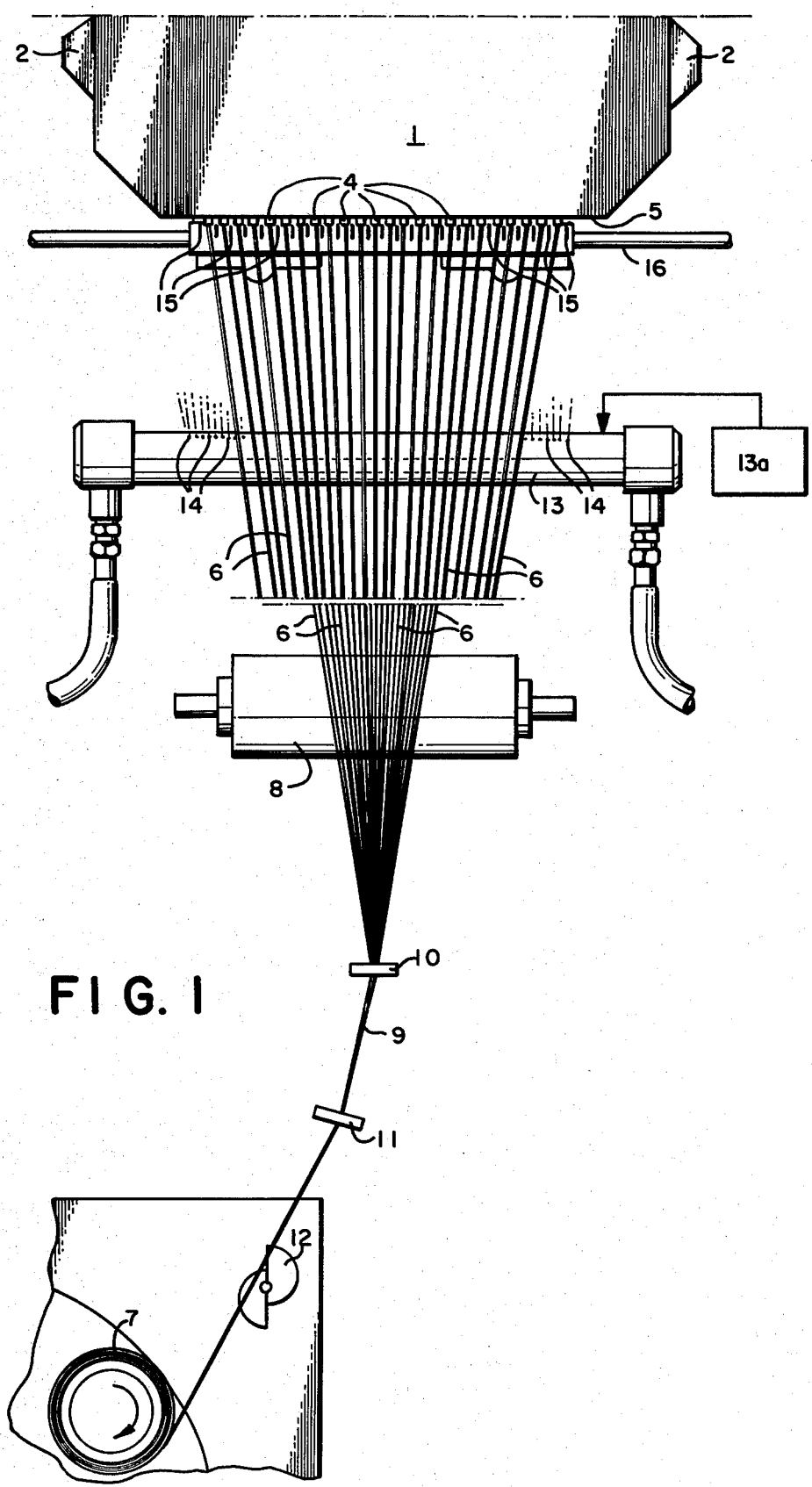
FIG. 1 is an overall schematic frontal elevation of apparatus used for the mechanical attenuation of fibers according to the present invention.

FIG. 1 shows the overall configuration of a fiberizing apparatus for forming glass fibers from glass in attenuable form and includes a bushing incorporating the principles of the invention.

Bushing 1, made for example from an alloy of Pt 90%, Rh 10%, is equipped with terminals 2 for the supply of electrical current used for heating by the joule effect. It contains a supply of glass in molten form which flows from orifices grouped in fiber forming regions on the undersurface of a series of elongated members termed bosses 4 projecting downwardly from the bottom of plate 5. As will be explained in detail hereinafter, the bosses are each provided with one or more rows of upwardly open cells or alveoles which communicate with the supply of molten glass within the bushing. Preferably the bosses are formed of the same alloy as the bushing.

The bushing is supplied with glass from a conventional glass supply source which can be the forehearth of a direct melt oven from which the glass flows into the bushing in molten condition or even a supply system delivering the glass as marbles, the latter being remelted in the bushing. Regardless of the supply source used, the flow of molten glass through the orifices is ensured primarily by the hydrostatic pressure of the molten mass located above the plate 5. The glass is attenuated into elementary filaments 6 by suitable means such as a revolving spindle or bobbin 7. In the manufacture of glass fiber strand, after application of sizing by means of a sizing pad, shown at 8, the filaments are gathered into one or more strands 9 by the means usually employed in this technique, such as combs 10 and 11. The strand is then wound around the revolving bobbin 7. The strand is distributed lengthwise of the bobbin by means of a distribution means such as the helical guide 12.

A blowing manifold 13, shown in FIG. 1, is mounted adjacent to and below the fiberizing level, and is provided with a series of openings 14, the openings being directed toward the bushing base. The openings can be provided with nozzles or take the form of simple orifices, placed closely together and parallel to the longitudinal axis of the bushing.

A typical manifold 13 is provided with a row of orifices of 1 mm in diameter and of which the distance between axes of adjacent orifices is about 2 mm. The length of the row is at least equal to that of the length of the bushing.

This manifold is placed below the fiberization level at a suitable distance, as for example between 100 and 160 mm from the longitudinal axis of the fiberization level.

The manifold can be stationary or rotary mounted; in the latter case its rotation speed can be on the order of 2 to 3 rotations per second so as to assure a uniform and complete blowing of the fiberization level. Means for rotating the manifold are shown schematically at 13a. The rotation of the manifold assures that the entire base of the bushing may be swept with gas during start-up and re-starting of the bushing. The periodic delivery of the gas produces a periodic variation in temperature and viscosity of the glass adjacent the orifices.

Other methods of blowing can be employed. For example, the gas current can be delivered by a simple flexible tube directed and manually displaced toward the bushing base, or by several stationary tubes.

The manifold 13, connected to a source of gas under pressure, not shown, provides for delivery of a current of gas at the time of the start of the fiberization operation, as explained hereafter.

In addition to cooling which occurs by thermal exchange between the bosses and the ambient gases circulated between the grooves separating the bosses, further cooling is desirably provided by cooling apparatus, partially shown in FIG. 2 and preferably of the fin cooling type. Spaced apart fins 15 are connected to at least one main tube or manifold 16 in which a cooling fluid, such as water, circulates. The fins are preferably constructed of metals having a good thermal conductivity. As explained hereinafter the fins 15 extend lengthwise of the grooves between the elongated bosses 4.

Turning now to FIGS. 2, 3, 4 and 6, it can be seen that the elongated bosses 4 are of generally rectangular cross section with generally vertical side walls and planar bottom walls. Each is comprised of a row of spaced apart cells termed alveoles 17 which communicate directly with the interior of the bushing. Although alveoles 17 may be formed in other ways which may lead to different cross sectional shapes, a preferred technique is to drill them out of the mass of material forming the bosses so that they have a circular cross section as viewed in FIG. 3.

The orifices in communication with each alveole are formed in clusters or groups, with each orifice of a group being equidistantly spaced from adjacent orifices in the same group. Each alveole shown in FIG. 3 is provided with a group of four fiber forming orifices extending through the planar wall portion in the bottom of the boss.

Orifice dimensions, distances between orifices and alveole dimensions are as set forth in copending application Ser. No. 207,712. The distance between adjacent orifices of adjacent clusters is more than 0.5 mm and preferably between 1.5 to 2.5 mm.

In the embodiment of FIGS. 2-4, shallow grooves 18 extend transversely of the bottom walls of the bosses, between the alveoles 17. The grooves 18 provide a separation of the region of the bottom of the boss surrounding the orifices in communication with one alveole with the regions surrounding the orifices in adjacent alveoles in each boss.

Although the width and depth of the grooves 18 may vary somewhat, excellent results have been obtained using grooves having a width of between 0.5 and 1 mm and having a depth less than 1.5 mm and preferably of about 0.5 mm. Grooves so formed have been found to be effective in preventing the propagation of flooding of glasses from the region surrounding the orifices of one alveole to the region surrounding the orifices of adjacent alveoles as will be explained more fully hereinafter.

FIG. 5 discloses an embodiment of the invention which is similar in construction to FIGS. 3 and 4 in that the alveoles 17 are formed in rows in bosses 4. According to the embodiment of FIG. 5, the bottom surfaces of the bosses are not provided with shallow grooves separating the regions beneath each alveole. In carrying out this embodiment of the invention, as compared with the embodiment of FIGS. 3 and 4, when the bushing is started up there is a flooding of the glass issuing through the orifices of one alveole to adjacent alveoles until a mass of glass is formed on the bottom of the boss. Tractive effort exerted on the mass of glass formed as a result of flooding together with periodic blowing is sufficient to individualize the flow of glass, first into one filament per alveole and then, if desired, into as many filaments as there are orifices.

Although in certain applications, the use of fin cooling devices may be eliminated, it is preferred that fins be employed and suitable fin structure is shown schematically in each of FIGS. 3 and 5. The relationship of the fins to the bosses and the alveoles can best be seen upon inspection of FIGS. 3, 5 and 6. The use of fins is in accordance with the teachings set forth in our co-pending application Ser. No. 207,712.

Although groups of four orifices are provided in the embodiments shown in FIGS. 3 and 5 it should be noted that the number of orifices may vary over a substantial range. A portion of a boss having three orifices per alveole is illustrated in FIG. 7. Seven orifices per alveole or even more may be employed.

Bosses having two rows of alveoles are illustrated in FIG. 8. When two rows of alveoles are provided, it is preferred that the alveoles in adjacent rows be placed in a staggered pattern in relation to one another.

Start-up of bushings of the type shown in FIGS. 2 through 4 is illustrated by reference to FIGS. 9a through 9c. As shown in these Figures, one elongated boss having a plurality of alveoles spaced in a row is shown for purposes of illustration but it is to be understood that in the preferred forms of the invention, a multiplicity of rows of bosses is provided with each boss having one or more rows of alveoles with a group of three or more orifices in communication with each alveole. The sequence of the Figures illustrates the mode of operation employed in the formation of one filament from each orifice of an alveole.

Figure 9A:
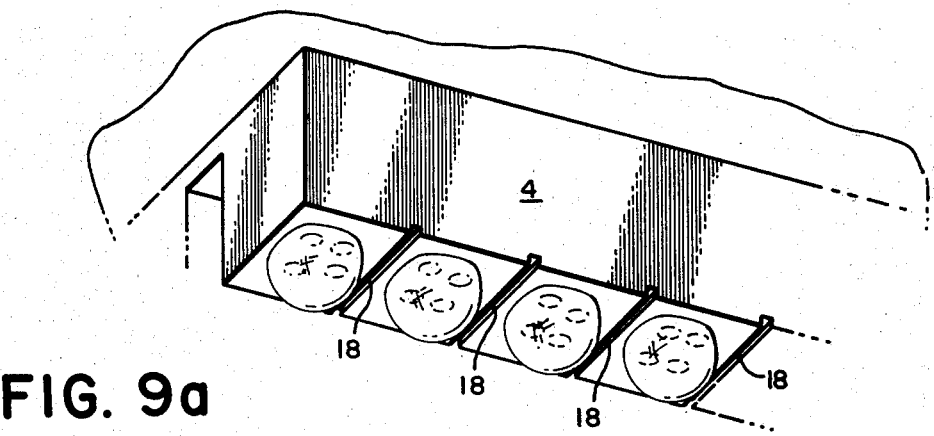

The molten glass supplying bushing 1 passes into the alveoles formed within each boss 4 and flows though each of the orifices 19 perforated on the underside of the bosses, rapidly flooding the surface as illustrated in FIG. 9a. The grooves 18 confine this flooding to the region of the bottom surface of the boss surrounding the orifices of one alveole from the region for the next alveole, thus preventing a propagation of flooding from one alveole to the next. The flow causes formation of a single globular mass per alveole which gradually falls as a result of its own weight, entraining in its wake a single stream of glass called a primary stream as illustrated in FIG. 9b.

The series of primary streams 20 so formed are manually collected and low speed mechanical attenuation is instituted.

A gas current, preferably of air at low pressure from source 13 of FIG. 1 is then delivered to the bushing base.

This results in a subdivision of each of the primary streams 20 into as many filaments 22 as there are orifices in the bottom of each alveole, this separation being illustrated in FIG. 9c.

The elementary filaments 22 are gathered into at least one strand and wound onto a revolving spindle or bobbin by the means illustrated in FIG. 1. Once separation is effected, the supply of blowing glass from the manifold may be interrupted and need not be utilized until it is needed to restart the bushing. However, it is preferred that the flow of gas current be maintained until the start of formation of the package.

It is preferred that the blowing device be rotatable about its axis by means schematically represented at 13a in FIG. 1. When a rotary blowing device is employed, the glass issuing from the orifices is periodically cooled as the gas cones are swept by gas during start-up. Preferably, the filaments of glass are alternately pulled by the operator and cooled by the gas during the starting procedure.

Figure 9B:
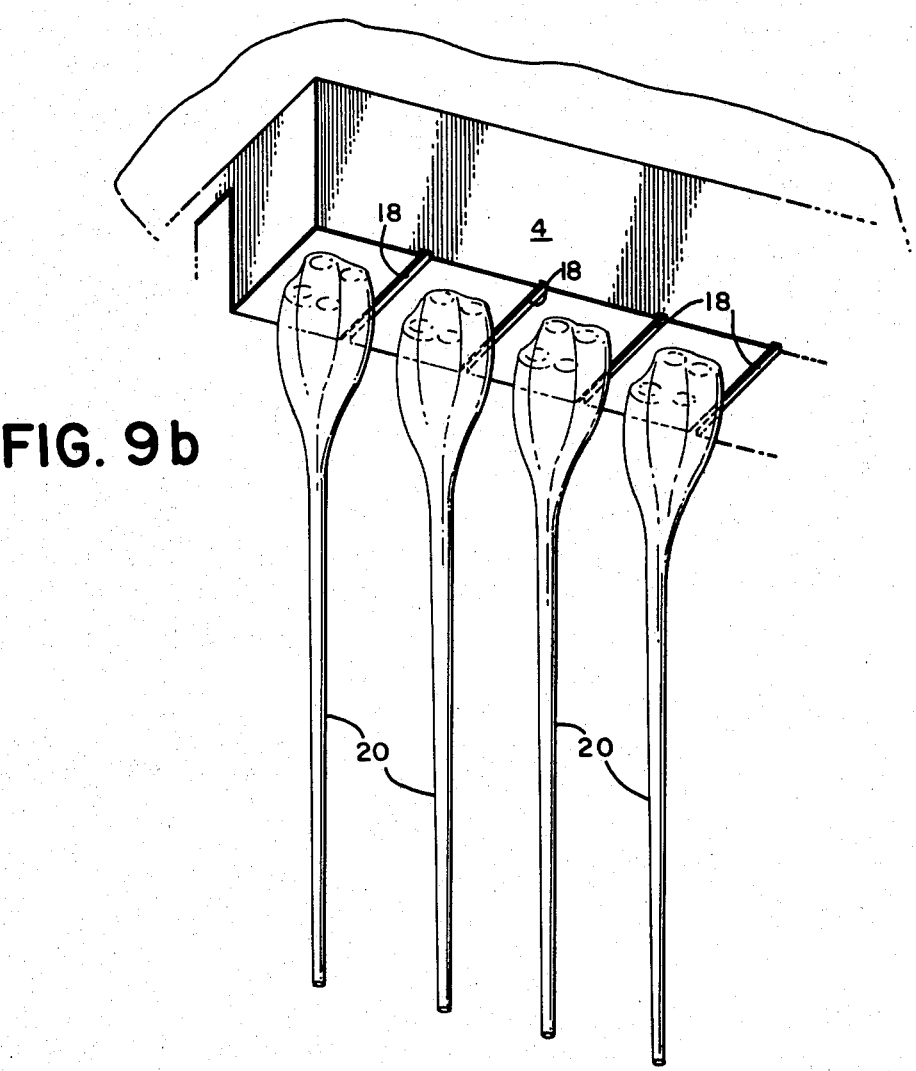

When it is desired to draw one filament per alveole, substantially the same operating cycle is used except that the action of the gas current is eliminated; one elementary filament per alveole as shown in FIG. 9b is thus obtained.

Although it is preferred in some applications that the gas current be terminated once fiberization has begun, for other applications it is desirable when drawing a filament from each orifice as in FIG. 9c, to maintain it during the entire fiberization operation.

By the above, reference is made to the fact that although it is preferred in some applications, for example when making fine diameter filaments at moderately high production rates, blowing may be discontinued after start-up but for other applications, for example when making large diameter filaments at very high production rates, blowing may be continued throughout the entire fiberizing operation.

When filament breakage occurs at one alveole, the glass issuing from the orifice where breakage occurs will flood from an orifice over the surface of the boss beneath the particular alveole and combine with the glass flowing from one or more of the other orifices from the same alveole. Since the glass cannot bridge the gap between alveoles, at the most the result is that flooding is confined to glass flowing from a single alveole and the glass issuing from the four orifices will produce a single filament having a diameter larger than the diameter of the filaments issuing from the other alveoles. As noted above, the presence of a few larger filaments being drawn from the bushing will not affect the quality of the end product so that an interruption of the fiberizing operation is not required.

FIG. 10 shows a modified form of invention which is similar to FIGS. 3 and 4. In FIG. 10, the longitudinal axes of the bosses are in parallel to the direction of current flowing from one to the other of the electric terminals 2, only one such terminal being shown in the Figure. Transverse grooves 18a, large enough to receive cooling fins, are provided in the bottom of the bosses between each alveole. In the illustrative embodiment, the transverse grooves 18a have a width of about 3.5 mm and a depth of 2.25 mm. Portions of fins 15 are illustrated in FIG. 10 so that the relation of the fins to the grooves can be seen.

Advantages of the method and apparatus described above may be seen from the following examples:

EXAMPLE 1

A bushing having the configuration of FIG. 3 was provided, having six alveoles of circular cross section machined in each of three solid bosses. Notches 0.5 mm deep and 0.5 mm wide were provided between the regions surrounding the orifices from each alveole. The bosses were 30.1 mm long and about 4.6 mm wide having a wall thickness of 0.5 mm at the bottom of each alveole. Orifices were 1.6 mm in diameter. The three rows of bosses were separated by grooves 3.5 mm wide. This bushing operated well with no flooding occurring from the bottom surface associated with one alveole to the surface associated with the next alveole. Results are shown in the table.

EXAMPLE 2

This bushing, having the configuration of FIG. 5, comprised three bosses each having seven alveoles. The bosses were 33 mm long and 4.7 mm wide, were separated by grooves 3.5 mm wide, but were devoid of grooves between alveoles. In operation of this bushing after a breakage there is flooding on the bottom of a boss which propagates from the region beneath one alveole to the region beneath the next alveole; however traction on the glass is sufficient to again individualize flow into a single filament per alveole. Afterwards, blowing was used to effect separation into as many filaments as there are orifices. Operation was good. Average restart time following breakage was 2.1 minutes.

EXAMPLE 3

This bushing had the configuration of FIG. 8 with the rows of alveoles within each boss beig staggered in relation to each other. Bosses were 8.8 mm wide and 18.9 mm long. The centerline to centerline distance of alveoles in a row was 4.7 mm. The centerline to centerline distance between rows was 4 mm. The rows of bosses were provided with three alveoles in one row and four alveoles in the next row. Alveoles were 4 mm in diameter; grooves 3.5 mm wide and 4.5 mm deep separated the bosses. Four orifices 1.6 mm in diameter were in communication with each alveole. The output per alveole was 230 mg/min. The output of this bushing was 220 mg/minute.

Results of operation of bushings of Examples 1–3 are tabulated below. For comparison purposes, results obtained with a bushing of the kind shown in U.S. application Ser. No. 207,712 are listed in the table in the column headed "TEM 4".

| TYPE OF BUSHING | | TEM 4 | BUSHING of Ex. 2 | BUSHING of Ex. 3 | BUSHING of Ex. 1 |
|---|---|---|---|---|---|
| Number of orifices* | | $\frac{a}{3} \times \frac{b}{6} \times \frac{c}{4}$ | $\frac{a}{3} \times \frac{b}{7} \times \frac{c}{4}$ | $\frac{a}{3} \times \frac{b}{(4+3)} \times \frac{c}{4}$ | $\frac{a}{3} \times \frac{b}{6} \times \frac{c}{4}$ |
| Restart Time R | R max. | 4 mn | 3 mn | 4 mn | — |
| | R average | 2.2 mn | 2.1 mn | 2.8 mn | ≈2 mn |
| | R minim. | 1 mn | 1 mn | 2 mn | — |
| Temperature limitation of operation without flooding: $\theta_L$ (bulb) | | 1168° C. | 1160° C. | 1160° C. | 1165° C. |
| Flow after a breakage at $\theta_L$ | Formation of bulb | 40 s | 150 s | 110 s | 150 s |
| | Fall of bulb | 3 mn 40 s | more than 10 mn | 9 mn 40 s | 5 mn 30 s |
| Unitary pull rate at $\theta_L$ in g/24 hr. | | 539 | 380 | 400 | 521 |
| Smallest filament diameter in microns | | 10.5 | 9 | 9 | 9 |

*a = no. of rows of bosses;
b = alveoles in each row;
c = orifices per alveole

In summary, bushings according to the invention can be used in the production of large numbers of extremely fine fibers. High orifice densities are made possible, with as many or more total orifices in a given area as provided in the bushings of our copending applications identified above. The bushings are simple to manufacture, have good structural rigidity and are characterized by good temperature stability and uniformity at the fiber forming orifices. As a consequence, fiber breakage is minimized and fibers of uniform diameter can be produced. Fibers as small as 8 microns in diameter can be produced with most fibers in a production run being of substantially the same diameter.

We claim:

1. Apparatus for use in the drawing of filaments from attenuable material in attenuable condition, such as molten glass, comprising a bushing having a chamber for the attenuable material in attenuable condition and having a bottom wall with downwardly presented portions at higher and lower levels, characterized in that the lower wall portions comprise the bottom walls of bosses each of which contains plural upwardly open alveoles, the said bosses being spaced in rows, the alveoles each being provided with a plurality of orifices extending through the bottom walls of the bosses for delivery of attenuable material through the alveoles, and mechanism spaced below the bushing for drawing filaments from attenuable material delivered through the alveoles from said chamber, and downwardly open channels between rows of bosses.

2. Apparatus according to claim 1 further including downwardly open shallow grooves on bottom walls of said bosses, said grooves each separating the region surrounding the orifices of an alveole from the region surrounding the orifices of an adjacent alveole.

3. Apparatus according to claim 1 or 2 wherein said alveoles have a substantially circular cross section.

4. Apparatus according to claim 1 or 2 wherein the downwardly presented surface of each boss is planar thoughout the region immediately surrounding the orifices therethrough.

5. Apparatus according to claim 1 or 2 wherein the orifices of each alveole are in groups of at least three orifices per group.

6. Apparatus according to claim 1 or 2 wherein a boss comprises a plurality of rows of alveoles.

7. Apparatus according to claim 1 or 2 wherein a boss comprises a single row of alveoles.

8. Apparatus according to claim 3 wherein the alveoles are each provided with at least three orifices and each orifice of an alveole is equidistantly spaced from adjacent orifices in the same alveole.

9. Apparatus according to claim 8 wherein the interaxial distance between adjacent orifices in an alveole is not more than 2.1 mm.

10. Apparatus according to claim 9 wherein the edge-to-edge distance between adjacent orifices in an alveole is between 0.2 mm and 0.5 mm.

11. Apparatus according to claim 6 wherein the alveoles of adjacent rows in a boss are staggered in relation to one another.

12. Apparatus according to claim 1 or 2 further including a blowing device spaced beneath said bushing, said blowing device having means for directing a current of gas to the region of the orifices in the bottom walls of bosses.

13. Apparatus according to claim 12 in which the blowing device has means for directing a current of gas continuously to the region of the orifices in the bottom walls of bosses.

14. Apparatus according to claim 12 wherein said blowing device is mounted for rotation about an axis which is substantially parallel to the bushing bottom wall, whereby a gas current is periodically directed towards the region of said orifices.

15. Apparatus according to claim 4 wherein boss height is between about 1 mm and about 10 mm.

16. Apparatus according to claim 2 wherein groove width is about 0.5 mm.

17. Apparatus according to claim 16 wherein groove depth is about 0.5 mm.

18. Apparatus according to claim 1 or 2 wherein said bushing has electrical connections at opposite ends for effecting electrical resistance heating of the bushing by the flow of electric current through the bottom wall from one of said connections to the other, the bosses being elongated and having their long axes extended lengthwise of the path of current flow.

19. Apparatus for use in the alternative drawing of attenuable material in attenuable condition, such as molten glass, into filaments of different sizes by change of fiberizing parameters, comprising a bushing having a chamber for attenuable material in attenuable condition and having a bottom wall with downwardly presented wall portions at higher and lower levels, the lower wall portions comprising bottom walls of elongated bosses each containing a plurality of upwardly open alveoles in communication with said chamber, the bosses being arranged in a plurality of rows, there being parallel downwardly open channels between the bosses, the lower walls of the bosses having groups of orifices, each group being in communication with an alveole for delivery of said material, and mechanism spaced below the bushing for drawing filaments from the material, the groups of orifices in the bottom of each boss each comprising a clustered group of at least three orifices positioned with substantially uniform spacing between adjacent orifices, the downwardly presented surface of each boss beig substantially continuous throughout the region immediately surrounding the orifices in communication with each alveole and the spacing between the orifices being sufficiently close to maintain a condition of flooding of said material on the substantially continuous surface between the orifices in communication with one alveole under one specific drawing temperature condition, but the orifices being sufficiently spaced to maintain a non-flooded condition under another drawing temperature condition and thereby provide for drawing of individual filaments from each orifice of an alveole.

20. Apparatus according to claim 19 in which the substantially continuous surface is planar.

21. Apparatus as defined in claim 19 and further including means for changing the fiberizing parameters during drawing of the filaments and thereby effect change between the drawing of a single filament from an alveole and the drawing of an individual filament from each orifice of said alveole.

22. Apparatus for forming strands from attenuable material in attenuable condition, such as molten glass, comprising a bushing having a chamber for the attenuable material in attenuable condition and having a bottom wall with downwardly presented wall portions at higher and lower levels, the lower wall portions comprising bottom walls of bosses containing alveoles upwardly open to communicate with said chamber, the bosses being arranged in parallel rows separated by channels with a plurality of alveoles in each boss, and the lower walls of the bosses having orifices for delivery of said material from the alveoles, mechanism spaced below the bushing for drawing filaments from said material, and means for cooling the material delivered through the orifices by effecting radiant heat absorption and comprising thermally conductive solid state cooling fins mounted lengthwise of a parallel series of said channels, means for cooling the fins by thermal conduction through the material of the fins lengthwise thereof to at least one end of each fin, said cooling means further including thermally conductive manifold means for a cooling medium, one end of each fin being connected to the manifold means to provide for thermal conduction of heat from the fins to the manifold means, the channels with which the cooling fins are associated being open ended to provide for intake of air and the channels and the cooling fins being proportioned and relatively positioned to provide free flow of air from said channels laterally to the regions immediately below the bosses, and the downwardly presented surface of each boss being substantially continuous throughout the regions immediately surrounding the orifices, the orifices in the bottom of each boss comprising a clustered group of at least three orifices in communication with each alveole, said orifices being positioned with substantially uniform spacing between adjacent orifices in each group and being sufficiently close to maintain a condition of flooding of said material on the continuous surface between the orifices in communication with each alveole and thereby provide for drawing a single filament from each alveole.

23. A method for drawing attenuable material in attenuable condition, such as molten glass, into filaments, characterized by delivering the attenuable material in attenuable condition downwardly through a bushing the bottom of which has a plurality of bosses each containing a plurality of spaced apart alveoles, each boss having a bottom wall having clustered groups of orifices therethrough, each group being in communication with an alveole, and concurrently drawing at least one filament from each alveole, independently of each other alveole, regardless of whether or not said material has flooded the bottom surface of any individual boss.

24. A method as defined in claim 23 and further including regulating the flooding of the bottom surfaces of the bosses by controlling the cooling of the attenuable material delivered through the orifices through the bottom walls of said bosses.

25. A method as defined in claim 24 in which the cooling is controlled to effect a separation of the attenuable material into an individual filament formed from the attenuable material delivered from each orifice of the bottom wall of each of said bosses.

26. A method for drawing attenuable material in attenuable condition, such as molten glass, into filaments, characterized by delivering the attenuable material in attenuable condition downwardly through a bushing the bottom of which has a plurality of elongated bosses, each boss containing a series of alveoles in communication with the attenuable material in the bushing, each boss having a substantially continuous bottom wall defining the lower boundaries of the alveoles, said bottom walls having a plurality of groups of orifices therethrough, each group being in communication with an alveole, controlling the cooling of the attenuable material delivered through the orifices through the bottom walls of the bosses to provide for flooding of the bottom surface of the bottom wall defining the lower boundary of an alveole, and drawing one filament from the flooded material from each group of orifices, on the bottom wall of each boss.

27. A method for drawing attenuable material in attenuable condition, such as molten glass, into filaments, characterized by delivering the attenuable material in attenuable condition downwardly through a bushing having a plurality of downwardly projecting elongated bosses, each boss containing a series of spaced apart alveoles, each boss having a substantially continuous bottom wall having a plurality of orifices therethrough in communication with the alveoles, controlling the cooling of the attenuable material delivered through the orifices of the bottom walls of the bosses to provide for flooding of the region of the bottom surface of each boss surrounding the orifices in communication with an alveole, drawing one filament from the flooded material on a said region of the bottom surface, after an interval of said drawing of one filament from said regions, controlling the cooling to establish a temperature of the delivered material at a lower level than that established during said drawing of one filament from all orifices of a region, thereby inhibiting said flooding, and drawing an individual filament from the attenuable material delivered from each orifice of the said region.

28. A method for drawing filaments from attenuable material in attenuable condition, such as molten glass, characterized by delivering the attenuable material in attenuable condition downwardly through a bushing having a plurality of downwardly projecting spaced apart bosses, the bosses containing series of alveoles upwardly open to communicate with the attenuable material in the bushing and having downwardly presented substantially continuous bottom walls defining the lower boundary of each alveole, a plurality of orifices in the planar bottom walls in communication with the alveoles, controlling the cooling of the attenuable material delivered through the orifices in said bottom wall to provide for flooding of the bottom surface surrounding the orifices communicating with an alveole, and drawing one filament from the flooded material on the bottom surface surrounding the orifices communicating with said alveole.

29. A method according to claim 28 further comprising regulating the drawing conditions to draw an individual filament from the attenuable material delivered from each orifice communicating with said alveole.

30. A method for drawing attenuable material in attenuable condition, such as molten glass, into filaments, characterized by delivering the attenuable material in attenuable condition downwardly through a bushing having a plurality of downwardly presented bosses, each boss containing a series of alveoles upwardly open to communicate with the attenuable material in the bushing and a downwardly presented substantially continuous bottom wall defining the lower boundary of the alveoles, a plurality of orifices in the continuous bottom wall in communication with each alveole, controlling the cooling of the attenuable material delivered through the orifices in said bottom wall to provide for flooding of the bottom surface surrounding the orifices communicating with an alveole, and drawing filaments from the material flowing through the orifices communicating with said alveoles.

31. A method according to claim 30 comprising controlling the cooling to draw a single filament from an alveole.

32. A method according to claim 30 comprising controlling the cooling to draw a plurality of filaments from an alveole.

33. Apparatus for use in drawing filaments from attenuable material in attenuable condition, such as molten glass, comprising a bushing having a chamber for the attenuable material in attenuable condition and said bushing having a bottom comprising a plurality of downwardly presented elongated bosses, said bosses enclosing rows of alveoles which are upwardly open to communicate with said chamber, the bosses having downwardly presented substantaily continuous bottom wall portions defining the lower boundaries of alveoles, there being a single cluster of orifices in each bottom wall portion in communication with each alveole.

* * * * *